United States Patent [19]
Ochiai et al.

[11] 3,861,440
[45] Jan. 21, 1975

[54] SEMI-RADIAL TIRE HAVING BREAKERS DISPOSED BETWEEN ADJACENT CARCASS PLIES

[75] Inventors: Koichiro Ochiai; Makoto Takahashi, both of Tokyo, Japan

[73] Assignee: Bridgestone Tire Company Limited, Tokyo, Japan

[22] Filed: Jan. 2, 1974

[21] Appl. No.: 429,880

Related U.S. Application Data
[63] Continuation-in-part of Ser. No. 212,437, Dec. 27, 1971, abandoned.

[30] Foreign Application Priority Data
Dec. 28, 1970 Japan............................ 45-119928

[52] U.S. Cl.............. 152/361 R, 152/354, 152/357
[51] Int. Cl............................................... B60c 9/18
[58] Field of Search........ 152/354, 355, 357, 361 R, 152/DIG. 19

[56] References Cited
UNITED STATES PATENTS

| | | | |
|---|---|---|---|
| 3,195,604 | 7/1965 | Boussu et al.................... | 152/361 R |
| 3,422,873 | 1/1969 | Liska................................. | 152/357 |
| 3,516,465 | 6/1970 | Guyot............................ | 152/361 R |
| 3,598,165 | 8/1971 | Hanus............................ | 152/361 R |
| 3,612,136 | 10/1971 | Gough............................ | 152/361 R |
| 3,620,279 | 11/1971 | Bartha et al.................. | 152/DIG. 19 |
| 3,685,564 | 8/1972 | Smithkey, Jr................. | 152/DIG. 19 |

Primary Examiner—Drayton E. Hoffman
Attorney, Agent, or Firm—Stevens, Davis, Miller & Mosher

[57] ABSTRACT

A semi-radial pneumatic tire having at least two carcass plies and at least two breaker strips. Each of the carcass plies includes parallel cords whose angle relative to the equatorial direction of the tire at tire sidewalls being 65° to 82°, while each of the breaker strips includes parallel cords disposed at an angle of 17° to 30° relative to the equatorial direction of the tire, the carcass cord angle in the tire crown portion relative to the tire equator being between that of the carcass cord at the sidewall and that of the breaker cord. All the breakers are disposed between adjacent carcass plies, and the width of each breaker in the direction of the axis of rotation of the tire is between 55 to 85 percent of the maximum tire width in the same axial direction.

8 Claims, 5 Drawing Figures

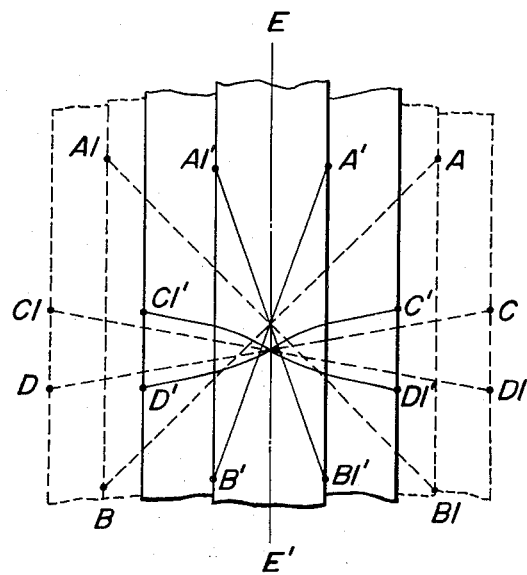
FIG_5

SEMI-RADIAL TIRE HAVING BREAKERS DISPOSED BETWEEN ADJACENT CARCASS PLIES

This application is a continuation-in-part application of U.S. Pat. application Ser. No. 212,437, which was filed by the present applicants on Dec. 27, 1971, now abandoned, while claiming the Convention Priority based on the corresponding Japanese application of Dec. 28, 1970.

BACKGROUND OF THE INVENTION

1. Field of the Invention

This invention relates to a pneumatic tire, and more particularly to a semi-radial pneumatic tire having a special construction.

2. Description of the Priot Art

Generally, speaking, radial tire cases have heretofore been made by the so-called two-stage process; namely, a first stage of stretching one or more radial carcass plies on the peripheral surface of a cylindrical former, so as to make a cylindrical carcass means, and a second stage of transforming the cylindrical carcasss means into a toroidal shape and applying breakers and a tread thereon.

On the other hand, bias tire cases have heretofore been made by the so-called one-stage process, in which breakers and a tread are applied to a carcass means when the carcass means is stretched on a cylindrical former. If the one-stage process is applied to the building of the radial tire, cords of the carcass plies tend to interfere with the movement of the cords of the breakers when the tire case is transformed from a cylindrical shape into a toroidal shape, so that it becomes difficult to ensure the desired angular deposition of the carcass ply cords and the breaker cords. Accordingly, the quality of the radial tire made by the one-stage process is greatly dispersed to deteriorate the efficiency of the overall manufacturing process on massproduction basis. Thus, in the case of the radial tires, the breakers and the tread are applied to the carcass means after the carcass means is transformed into the toroidal shape, in accordance with the two-stage process. The two-stage process has, however, a shortcoming in that it is rather complicated and costly.

Several proposals have been made to overcome the aforesaid shortcoming of the two-stage process by using a modified one-stage process: namely, an approach of severing the breakers in the equatorial direction of the tire, as disclosed in the U.S. Pat. No. 2,945,525; an approach of using short-fiber reinforced breaker or a rubber breaker, so as to eliminate the breaker cords; an approach of inserting such a rubber layer between the carcass means and the breaker, which is comparatively easily deformable, so as to eliminate direct interference between the carcass cords and the breaker cords; and an approach of sandwiching the breakers by carcass plies while maintaining the carcass cord angle close to 90° relative to the equatorial direction of the tire, as disclosed by U.S. Pat. No. 3,518,140. All such prior proposals have inherent shortcomings, respectively, and none of them have been practised yet on industrial scale.

More particularly, the severing the breakers and the elimination of the breaker cords result in a fatal deterioration of the rigidity of the breakers. It is well known to those skilled in the art that the so-called belting effect of the breakers is indispensable in the radial tires, so as to provide the required rigidity to the tire in radial directions emanating from the axis of rotation of the tire. If the rigidity of the breakers per se is too low, the desired belting effect cannot be achieved.

The insertion of the easily deformable rubber layer between the carcass means and the breakers causes an increase of the cost. Furthermore, such easily deformable rubber layer tends to cause dissymmetry of the tire about its axis of rotation or with respect to its equatorial plane, as well as a considerably large dispersion of quality among supposedly identical tires. Such dissymmetry and quality dispersion are likely to be caused, because as the breakers tend to shrink in the width direction upon transformation of the cylindrical tire case into the toroidal shape, the shrinking breakers forcibly pull a tread rubber layer disposed thereon toward the equatorial center of the tire in a non-uniform fashion due to the easily deformable nature of the inserted rubber layer.

The aforequoted U.S. Pat. No. 3,518,140 relied on the "pantograph" type deformation of breaker cords upon transformation of a cylindrical tire case into a toroidal shape, after sandwiching the breaker strips by carcass plies having carcass cords disposed at an angle of 85° to 90° relative to the equatorial direction of the tire. The large carcass cord angle, however, presents a considerably large resistance to the pantograph type deformation of the breakers, so that it has been difficult to have uniform deformation of the breakers. Consequently, with such a large carcass cord angles relative to the tire equator, it has been difficult to ensure symmetry of the tire properties about its axis of rotation and the uniformity among different tires.

Therefore, an object of the present invention is to obviate the aforesaid difficulties of the conventional one-step process for building radial tire cases, by using a comparatively large carcass cord angle relative to the tire equator, which carcass cord angle is clearly larger than the corresponding carcass cord angles of bias tires but not in excess of 82°.

The conventional radial tire has another shortcoming that the breaker plies acting as a belting member tend to make the tire tread too hard. When radial tires with very hard tire crown portions run on a gravel road or similarly uneven road, the very hard tire treads tend to vibrate and the vibration may be transmitted to drivers or passengers of the vehicle to which the subject tires are mounted.

Another difficulty which has been experienced with the conventional radial tire is that the edge portions of tire tread tend to be worn rather quickly in an uneven manner. This unevenness of the wearing of the tread at the edge portions thereof may be due to the discontinuity of the effect of reinforcing cord members. More particularly, the breaker cord members may become separated from the rubber portion of the breaker layer at the breaker edges, and the breaker cord members may intrude into the tread rubber, so that the rigidity of the tread rubber may become discontinuous at those positions where the tread reinforcing cord members intruded therein.

Therefore, another object of the present invention is to mitigate the aforesaid difficulties of conventional radial tire by providing an improved semi-radial tire which is comparatively free from the vibration of the tire tread and the non-uniform wearing of the tire tread edges.

SUMMARY OF THE INVENTION

According to the present invention, there is provided a pneumatic tire comprising two rubber coated carcass plies extending between beads, each of said carcass plies consisting of parallel cords whose angle relative to the equatorial direction of the tire at tire sidewalls being 65° to 82°, the cords of the two carcass plies crossing with each other, a breaker means disposed between adjacent carcass plies at a crown portion of the tire, said breaker means consisting of at least one pair of breaker plies each having parallel cords disposed at an angle of 17° to 30° relative to the equatorial direction of the tire, the cords of the paired breaker plies crossing with each other, the carcass cord angle in the tire crown portion relative to the tire equator being between that of the carcass cord at the sidewall and that of the breaker cord, the width of said breaker means in the direction of the axis of rotation of the tire under inflated conditions being 55 to 85 percent of the maximum width of the tire in the same direction, a rubber layer means covering the outer surface of the tire.

According to the present invention, the carcass cord angle relative to the equatorial direction of the tire at the tire sidewall is selected to be in a range from 65° to 82°, because the inventors have found that the cord angle of the carcass cords of this angular disposition ensures smooth transformation of a cylindrical case of the tire into a toroidal shape, by allowing the carcass cord angle and the breaker cord angle to smoothly vary during the transformation of the tire case. What is meant by the "cord angle" is the angle between the cord and the equatorial direction of the tire. The tire with a carcass cord angle of 65° to 82° is usually referred to as a semiradial tire. Once the smooth deformation of the breaker layers during the transformation of the cylindrical tire case into the toroidal shape is achieved, the aforesaid difficulties of conventional one-stage process of building radial tire case are mitigated.

The deformation of the breakers is inevitable in the one-stage building of the tire carcass, because the crown circumference or the equator of the cylindrical tire case increases upon transforming it into the toroidal case, so as to elongate the breaker strips mounted on the outer surface of the crown portion of the tire carcass. As being elongated, the breaker strip width is reduced, as generally referred to as pantographing type deformation.

If the cord angle of the carcass plies is larger than 82°, the cord angle of the carcass plies cannot vary during the transformation of the tire case from the cylindrical shape to the toroidal shape, so as to cause the possible dissymmetry and the non-uniformity of the tires, as pointed out in the foregoing. On the other hand, if the cord angle of the carcass plies is smaller than 65°, the cord angle of the carcass plies can easily vary during the aforesaid transformation of the tire carcass but the durability of the carcass cords is materially deteriorated. More particularly, with such excessively low carcass ply cord angle, carcass cord breakage has frequently been experienced in the proximity of edge portions of the breakers. Furthermore, if the carcass cord angle is smaller than 65°, most of the advantageous properties of semi-radial tires, such as high maneuverability, are lost. What is meant by the "maneuverability" is the operating properties of the tire, such as the cornering characteristics.

The breaker cord angle in the semi-radial tire according to the present invention is selected in a range of 17° to 30°. If the breaker cord angle exceeds 30°, the belting effect, which is indispensable in semi-radial tires cannot be ensured, and the maneuverability of the tire is likely to be noticeably deteriorated. On the other hand, if the breaker cord angle is smaller than 17°, the smooth deformation of the breaker strips during the transformation of the tire case from the cylindrical shape to the toroidal shape cannot be ensured.

In the semi-radial tire according to the present invention, the width of any of the breaker strips under inflated condition is required to be 55 to 85 percent of the maximum width of the tire. Both the breaker strip width and the tire width are taken in parallel with the axis of rotation of the tire. As well known in the art, the opposite end portions of the carcass plies are folded back toward the peripheral center line of the carcass or the tire equator, so as to enclose tire bead members at the edges, respectively. If the breaker strip width exceeds 85 percent of the maximum width of the tire, the folded-back edge of the carcass ply may overlie on the side edge of the breaker strip, directly or indirectly through one or more carcass plies disposed therebetween. Such overlying of the folded-back end of the carcass ply on the breaker strip or strips is very harmful to the smooth transformation of the cylindrical tire case into the toroidal shape. More particularly, during the aforesaid transformation of the tire case, the folded-back edge portion of the carcass plies should move toward the tire beads while the breaker strips should swell toward the tire crown. such movement of the folded-back portion of the carcass plies should not interfere with the swelling of the breaker strips, but the aforesaid overlying may cause such undesirable interference. The interference between the folded-back portion of the carcass plies and the breaker strips will result in dissymmetry of the semiradial tire and the non-uniform properties of semi-radial tires thus made. On the other hand, if the breaker strip width is narrower than 55 percent of the maximum tire width, the belting effect becomes insufficient for ensuring satisfactory maneuverability of the tire.

According to an important feature of the present invention, the carcass cords in the tire tread portion are pulled by the breaker cords, so that the angle of the carcass cords relative to the tire equator at the tire tread portion becomes an intermediate value between the breaker cord angle and the carcass cord angle at the tire sidewalls. As a result, the carcass plies are slackened in the tire crown portion to such an extent that the rigidity of the tire tread according to the present invention is produced practically by the rigidity of the breaker plies alone, and the crown portion of the carcass plies does not contribute to the rigidity of the tire tread so much. Consequently, the rigidity of the tire tread of the semi-radial tire according to the present invention is considerably smaller than that of the conventional radial tire, so that undesirable vibration caused by excessive hardness of the conventional radial tire can be mitigated by the semi-radial tire of the invention. Yet, the semi-radial tire of the invention ensures a high mechanical strength against trodding nails or the like by fully utilizing the presence of the carcass plies along with the breaker plies at the tire crown portion.

With the present invention, it is also possible to dispose a pair of reinforcing layers between opposite edges of the breaker means and an innermost carcass ply, respectively, which reinforcing layers having a Young's modulus which is larger than that of the carcass coating rubber.

BRIEF DESCRIPTION OF THE DRAWING

For a better understanding of the invention, reference is made to the following drawings, in which:

FIG. 5 is a schematic front view showing the relationship between breaker cords and carcass cords.

Like parts are designated by like numerals throughout the drawings.

DESCRIPTION OF THE PREFERRED EMBODIMENT

The invention will now be described in further detail by referring to examples.

Figure 1:
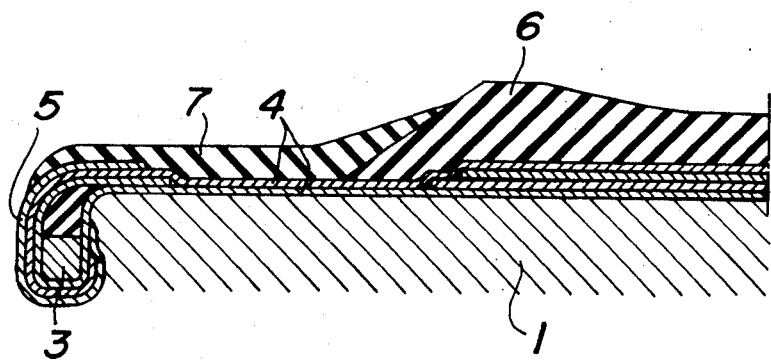
FIG. 1 is a sectional view of a tire according to the invention, shown as formed on a cylindrical former for building its case in one-stage operation.

Semi-radial pneumatic tires of 165 SR 13 4PR, according to the present invention, were fabricated. FIG. 1 shows the manner in which a case of the semi-radial tire was made on a 350 mm wide cylindrical metallic former 1. A 500 mm wide rubberized carcass ply 2 with parallel nylon cords, each consisting of two 1,260 denier twisted yarns, was spread on the former 1, so as to dispose its cords at 81° relative to the peripheral center line of the former 1. Two bead wires 3, 3' (see FIG. 2, only the bead wire 3 is shown in FIG. 1), each consisting of wires and insulating rubber, were placed along the edge portions of the carcass ply, and the ply was folded back so as to enclose the bead wires from the outside to the inside of the tire, respectively, as shown in the figure.

Two 190 mm wide rubberized breaker strips 8 and 9, each having steel cords, were spread on the carcass ply while aligning the peripheral center lines of the breaker strips with that of the carcass ply 2, so as to dispose the steel cords of the two breaker strips 8 and 9 at angles of 40° to 53°, preferably 50°, relative to the peripheral center line of the former 1 on opposite sides thereof. The width of the breaker strips 8 and 9 represents 45 to 70 percent of toe to toe width, or bead to bead width, of the green case (only one of the green case toes is shown in FIG. 1 at the vertical edge of the former).

Another rubberized carcass ply 4 of 450 mm width, consisting of nylon cords each made of two 1,260 denier twisted yarns, was spread on the breaker strips 8 and 9 and the first ply 2 in an alignment therewith, so as to dispose the cords of the ply 4 at the same cord angle but in the opposite sides of the peripheral center line of former 1. The opposite edges of the carcass ply 4 were folded back so as to enclose the bead wires 3, 3' from the outside to the inside of the tire, as shown in FIGS. 1 and 2.

Figure 2:
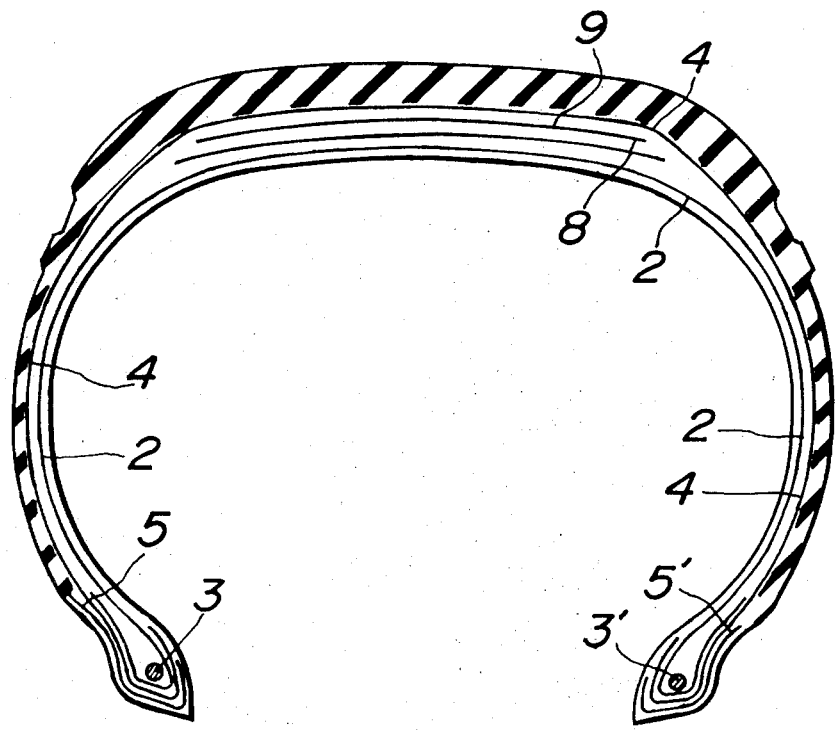
FIG. 2 is a schematic sectional view of a tire according to the present invention, shown as completed.

A pair of chafers 5 and 5', each consisting of a rubberized woven canvas, were applied to the outer surface of the bead portions 3, 3', so as to enclose them from the outside of the carcass plies, as depicted in FIGS. 1 and 2. Finally, a tread rubber layer 6 and a pair of side rubber layers 7 were applied in position on the outer surface of the carcass ply 4, in a manner known to those skilled in the art. The assembly thus fabricated was removed from the former 1, to provide a green case (non-vulcanized tire) which was ready for vulcanization.

The green case was vulcanized or cured by a conventional process for vulcanizing bias tires. More particularly, the green case was loaded in a vulcanizing machine, and it was transformed into a toroidal shape by bending it around a pre-inflated bladder (not shown), followed by curing at 165° C for 20 minutes.

Thus, a semi-radial tire according to the invention was completed, of which schematic sectional view is shown in FIG. 2. In the finished semi-radial tire, the cord angle of the carcass plies 2 and 4 at the central portion of the tire crown was 68°, and that for the breaker strips 8 and 9 at the same portion was 20°. The carcass cord angle relative to the tire equator at the tire sidewall was 80°. The widths of the breaker strips 8 and 9 in the finished semi-radial tire under inflated conditions were 120 mm and 100 mm, or about 70 and 60 percent of the maximum tire width 173 mm, respectively. This breaker width represents 25 to 40 percent of the bead to bead width of the peripheral length of the horse-shoe shaped cross section of the tire.

When the green case of the tire is produced, the carcass plies and the tread plies are spread on a cylindrical former, as shown by dotted lines in FIG. 5. A bladder is usually used for shaping the cylindrical tire case to a toroidal case. When the carcass and breaker plies are formed into toroidal shape, the widths of those plies are shrunk, as shown by solid lines in FIG. 5. More particularly, when the toroidal case is formed, cords AB and A1B1 of the breaker plies on the cylindrical former are forced to positions A'B' and A1'B1' of the figure, respectively. Similarly, cords CD and C1D1 of the carcass ply cords are forced to the positions C'D' and C1'D1', respectively.

When being transformed into the toroidal case, the carcass cords are forced to intrude into an inner liner rubber in response to the pressure applied by the bladder. If the cord angles of the carcass plies and the breaker plies are not properly selected, the innermost peripheral surfaces of the carcass cords may penetrate all the way through the inner liner rubber, and they will become visible from the inside of the toroidal space of the tire case, and such a tire is not suitable for sales on commercial basis. According to an established practice, the maximum allowable extent of the carcass ply cords into the inner liner rubber is about 0.6 times the thickness of the inner liner rubber, as measured in the radial direction of the tire relative to the axis of rotation of the tire.

The inventors have tested the rate of cord intrusion into the inner liner rubber, which is given by a ratio of the radial depth of the carcass cord intrusion in the inner liner to the radial thickness of the inner liner without any intrusion, for different cord angle arrangements for the carcass and breaker plies.

Based on the results of such tests, the breaker cord angle of 17° to 30° and the carcass cord angle of 65° to 82° were chosen.

It should be noted that, with the semi-radial tire thus formed, the cord angle of the carcass plies relative to the tire equator at the midcircumferential plane is between the cord angle of the breaker plies and the carcass cord angle at the tire sidewalls. Thus, the carcass plies at the tire crown portion become somewhat slackened, as shown in FIG. 5, and the crown portion of the carcass plies becomes more flexible than the breaker plies, so that the carcass plies do not contribute much to the hardness of the tire. On the other hand, with conventional radial tires, the tire crown portion tends to become too hard, because the hardness of the carcass plies and the breaker plies are fully combined thereat. If the tire crown portion is too hard, the tire crown tends to vibrate when running on a gravel road or on a similarly uneven road surface, which vibration is detrimental to the comfort of the driver or passengers. The present invention mitigates such difficulty of the conventional radial tire by providing a comparatively less hard tire crown portion.

With the semi-radial tire of the invention, breaker cords are sandwiched between carcass plies, and the opposite ends of the breaker cords are held as aligned by the carcass plies, so that the hardness of the edge portions of the tire crown is made uniform. Whereby, uneven wearing of the edge portions of the tire crown, which has been experienced with the conventional radial tires, can be completely eliminated.

Nevertheless, the presence of the carcass plies along with the breaker plies at the tire crown portion provides a very high protection of the tire crown against foreign matters, e.g., nails, because all the breaker plies and the breaker plies contribute to such protection.

It may be stressed here that, with the construction of the semi-radial tire according to the present invention, a tire having the advantages, e.g., excellent handling characteristics, of the radial tire can be manufactured by the so-called one-stage process. As well known, radial tires are difficult to make by the one-stage process. Besides, the slight crossing of the carcass plies in the semi-radial tire results in a better lateral rigidity than that of conventional radial tires having only parallel carcass plies.

Figure 3:
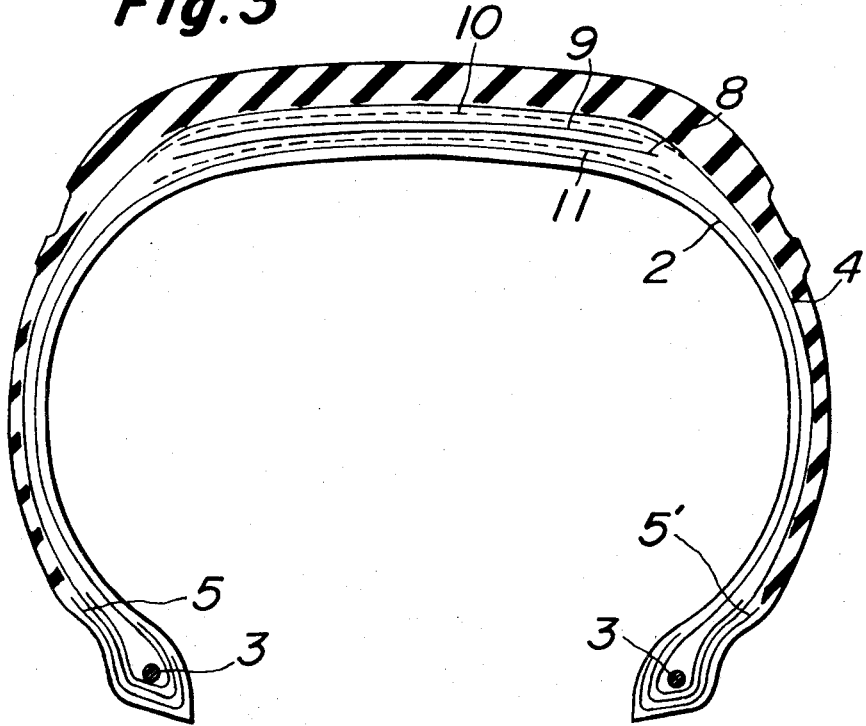
FIGS. 3 and 4 are schematic sectional views, illustrating different embodiments of the present invention.
Figure 4:
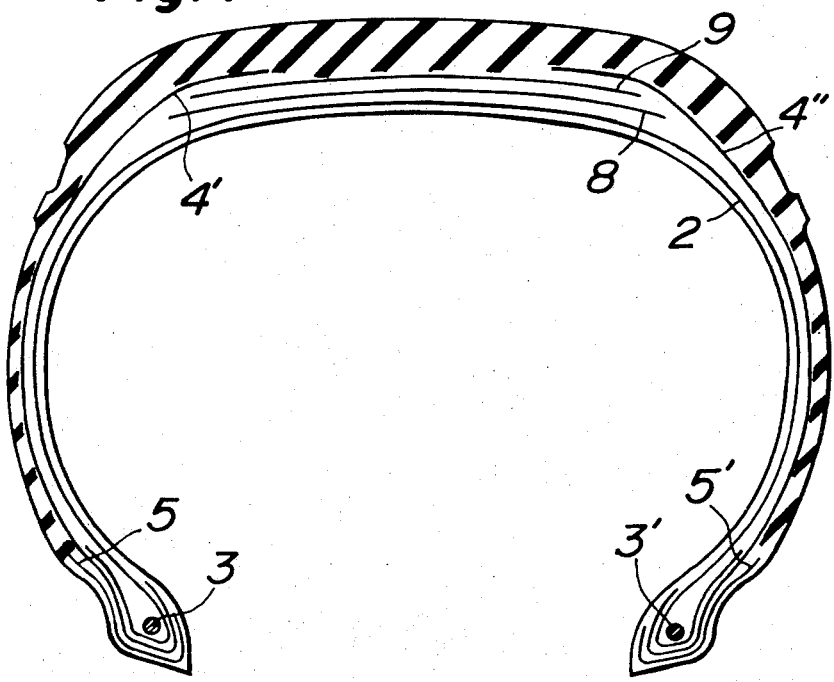

FIGS. 3 and 4 illustrate schematic sectional views of different embodiments of the invention. In FIG. 3, about 0.3 mm to 1.0 mm thick rubber sheets 10 and 11 were inserted between a carcass ply 2 and a breaker strip 8 and between a breaker strip 9 and a carcass ply 4, respectively. The rubber sheets 10 and 11 were easily deformable before vulcanization. Otherwise, the semi-radial tire of FIG. 3 was identical with that of FIG. 2. The two rubber sheets 10 and 11 proved to be effective in ensuring the smooth variation of the cord angles of the breaker strips 8 and 9 during the transformation of the cylindrical case into the toroidal shape.

FIG. 4 shows a modification of the semi-radial tire of FIG. 2 by adding a pair of reinforcing layers 12 and 12' between an inner carcass ply 2 and one edge of an inner breaker strip 8 and between the carcass ply 2 and the opposite edge of the inner breaker strip 8, respectively. The width of each reinforcing layer 12, 12' is one third to one tenth of the width of the breaker strip 8. The reinforcing layers 12 and 12' are rubberized woven cloths of suitable tire cords, for instance, nylon, rayon, or steel cords. The reinforcing layers 12, 12' also serve to facilitate the shaping of a cylindrical green case into a toroidal shape by allowing smooth sliding of the breaker plies 8 and 9 relative to the innermost carcass ply 2. To this end, the reinforcing layers 12, 12' should preferably have a Young's modulus which is larger than that of the carcass coating rubber.

It was proved by tests that the construction of FIG. 4 was effective in preventing the breaker end separation, i.e., the separation of the outer rubber layer in the proximity of the breaker edges, and non-uniform abrasion of the tire.

What is claimed is:

1. A semi-radial tire having cord reinforcements, said cord reinforcements consisting of
    two rubber coated carcass plies extending between beads, each of said carcass plies consisting of parallel cords, the carcass cords in tire sidewall portions being disposed at an angle of 65° to 82° relative to the equatorial direction of the tire, the cords of the two carcass plies crossing with each other;
    a breaker means disposed between adjacent carcass plies at a crown portion of the tire, said breaker means consisting of at least two breaker plies each having parallel cords disposed at an angle of 17° to 30° relative to the equatorial direction of the tire, the cords of the paired breaker plies crossing with each other, the angle of the carcass cords at midcircumferential plane relative to said equatorial direction being intermediate between said breaker cord angle and said carcass cord angle at the tire sidewall portion;
    the width of said breaker means in the direction of the axis of rotation of the tire under inflated condition being 55 to 85 percent of the maximum width of the tire in the same direction; and
    a rubber layer means covering the outer surface of the tire.

2. A semi-radial tire according to claim 1 and further comprising a pair of reinforcing layers disposed between opposite edges of said breaker means and an innermost carcass ply, respectively, said reinforcing layers having a Young's modulus which is larger than that of carcass coating rubber.

3. A semi-radial tire according to claim 2, wherein said reinforcing layers having parallel cords made of organic fibers and disposed at an acute angle with the carcass cords.

4. A semi-radial tire according to claim 1, wherein the cords of the adjacent carcass and breaker plies cross with each other.

5. A semi-radial tire according to claim 1, wherein said breaker cords are steel cords.

6. A semi-radial tire according to claim 1, wherein said carcass cords are made of a material selected from the group consisting of nylon and polyester.

7. A semi-radial tire according to claim 2, wherein said reinforcing layers having a Young's modulus which is greater than but substantially similar to that of the carcass coating rubber.

8. A semi-radial tire according to claim 1, wherein the carcass cord angle at the midcircumferential plane is 68° and the breaker cord angle there is 20°.

* * * * *